United States Patent [19]
Wick et al.

[11] 3,939,113
[45] Feb. 17, 1976

[54] PROCESS FOR THE BULK DYEING OF POLYESTERS

[75] Inventors: Arnold Wick, Therwil; Max Jost, Oberwil, both of Switzerland

[73] Assignee: Ciba-Geigy Corporation, Ardsley, N.Y.

[22] Filed: July 29, 1974

[21] Appl. No.: 492,629

[30] Foreign Application Priority Data
Aug. 2, 1973 Switzerland.................... 11224/73

[52] U.S. Cl................................. 260/40 P; 8/39 C
[51] Int. Cl.$^2$........................................ C08L 67/00
[58] Field of Search ................ 264/40 R; 260/40 P

[56] References Cited
UNITED STATES PATENTS
3,840,567   10/1974   Genta............................ 260/40 R X

*Primary Examiner*—Lewis T. Jacobs
*Attorney, Agent, or Firm*—Vincent J. Cavalieri

[57] ABSTRACT

Process for the bulk dyeing of polyesters, characterised in that the dyestuffs used are anthraquinone derivatives of the formula

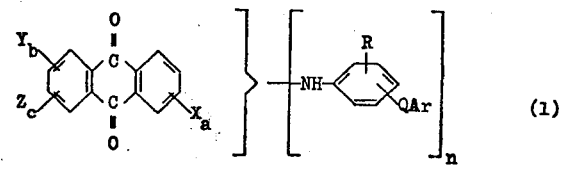

wherein Q denotes one of the bridge members —O— or —CO—, R denotes hydrogen or an alkyl group containing 1–4 carbon atoms, Ar denotes an aryl group, $n$ denotes a number from 1 to 4, X, Y and Z denote an amino, hydroxyl, alkoxy, aryloxy, alkylmercapto, arylmercapto, arylamino or aroylamino group or halogen and $a$, $b$ and $c$ each denote zero or a number from 1 to 4, with the sum of $n+a+b+c$ being a number from 1 to 6.

8 Claims, No Drawings

PROCESS FOR THE BULK DYEING OF POLYESTERS

It has been found that anthraquinone derivatives of thr formula

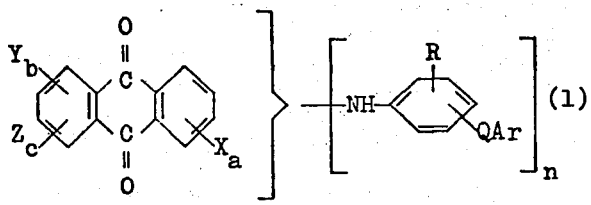

wherein Q denotes one of the bridge members —O— or —CO—, R denotes hydrogen or an alkyl group containing 1—4 carbon atoms, Ar denotes an aryl group, $n$ denotes a number from 1 to 4, X, Y and Z denote an amino, hydroxyl, alkoxy, aryloxy, alkylmercapto, arylmercapto, arylamino or aroylamino group or halogen and $a$, $b$ and $c$ each denote zero or a number from 1 to 4, with the sum of $n+a+b+c$ being a number from 1 to 6, are outstandingly suitable for the bulk dyeing of polyesters.

Ar is preferably a phenyl, naphthyl or diphenyl group, the number of carbon atoms in the alkoxy and alkylmercapto group is preferably 1–6, aryl in the aryloxy, arylmercapto, arylamino and aroylamino group is preferably phenyl and halogen is preferably chlorine or bromine.

Compounds of particular interest are the aryloxyanilinoanthraquinone derivatives of the formula

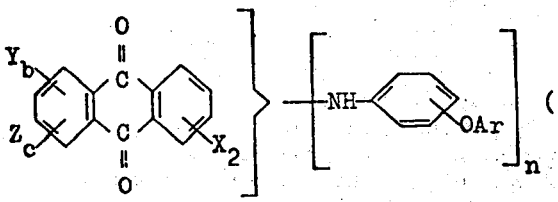

and preferably derivatives of the formula

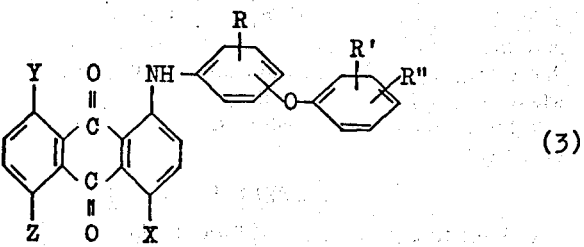

wherein X, Y and Z denote hydrogen or a hydroxyl, benzoylamino, phenylamino or phenylmercapto group and one of the radicals X, Y and Z can also be

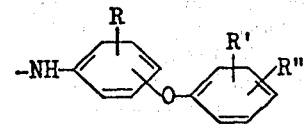

and R' and R'' denote hydrogen atoms or alkyl groups containing 1–4 carbon atoms and R'' also denotes the phenyl group if R and R' are hydrogen atoms, and especially those of the formula

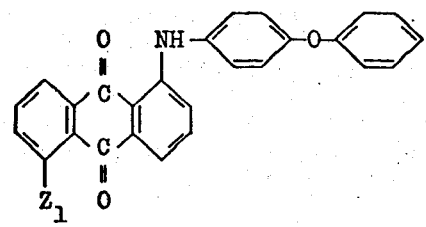

wherein $Z_1$ is a benzoylamino, phenylmercapto or 4-phenoxyanilino group.

1,4-Di(4'-phenoxyanilino)-anthraquinone and a process for its manufacture from 1,4-dihalogenoanthraquinone and aminodiphenyl ether are already known from German Patent Specification No. 706,608. After sulphonation, the compound is used for dyeing wool.

German Patent Specification No. 1,128,066 describes diarylketones bonded via an amino group to anthraquinone derivatives. In this patent, they are proposed for the spin dyeing of cellulose acetate, viscose, polyacrylonitrile, polystyrene and polyamide.

1-(2'-Benzoylanilino)-anthraquinone and 1,5-bis-(2'-benzoylanilino)-anthraquinone were described by F. Mayer and W. Freund in Ber. 55 (1922), page 2,055.

The anthraquinone derivatives used in accordance with the invention can be manufactured by condensing an anthraquinone derivative which in addition to the substituents X, Y and Z contains at least one mobile halogen, preferably in the α-position, with 4-aminophenyl aryl ethers or 4-aminophenyl aryl ketones in the presence of an acid-binding agent, such as an alkali metal carbonate or alkali metal acetate, and of a copper catalyst, in a higher-boiling solvent.

The following may be mentioned as examples of halogenated anthraquinone derivatives suitable for the condensation reaction: 1-Chloroanthraquinone, 1,4-, 1,5- or 1,8-dichloroanthraquinone, 1,4,5,8-tetrachloroanthraquinone, 1-chloro-4-, -5- or -8-benzoylaminoanthraquinone, 1-bromo-4-benzoylaminoanthraquinone, 1,5-dibromo-4,8-dibenzoylaminoanthraquinone, 1-chloro-4- or -5-hydroxyanthraquinone, 1,4-dichloro-5,8-dihydroxyanthraquinone and 1,5-dichloro-4,8-dihydroxyanthraquinone.

However, preferably the anthraquinone derivatives used according to the invention are obtained by condensation of chlorophenyl aryl ethers or ketones or bromophenyl aryl ethers or ketones with an aminoanthraquinone derivative which contains at least one amino group, preferably in the α-position, in addition to the substituents, X, Y and Z, by allowing the two reactants to react in a higher-boiling diluent, in the presence of an acid-binding agent and of a copper catalyst, at a temperature between 140° and 220°C, preferably between 160° and 200°C.

As a particularly advantageous variant of the second method of manufacture, there exists the possibility, in the case of the reaction with monobromodiphenyl ether derivatives, of preparing the latter, prior to the condensation, in the same medium by monobromination of the corresponding diphenyl ether derivatives at temperatures in the range from −10° to 60°C, preferably 0° to 30°C, optionally in the presence of a halogenation catalyst, and thereafter, following addition of the acid-binding agent, of the aminoanthraquinone, especially of a monoaminoanthraquinone, and of the copper catalyst, carrying out the condensation to the phenoxyanilinoanthraquinone, as a result of which the manfacturing process is carried out as a one-pot process.

The mixture formed thereby, which essentially consist of the corresponding 4-phenoxyanilinoanthraquinone derivatives or isomers and in addition can contain small amounts of dicondensation products which are derived from dibromination products of the diphenyl ether derivative employed, are very particularly suitable for use as dyestuffs for the bulk dyeing of polyesters, because of their higher solubility and lower tendency to crystallise, and are distinguished by improved fastness properties compared to the pure dicondensation products.

The following may be mentioned as examples of diphenyl ether derivatives which can be used, in accordance with the above one-pot variant, for condensation with aminoanthraquinones: Diphenyl ether, 2-, 3- or 4-methyldiphenyl ether, 2,3-, 2,4-, 2,5-, 2,6-, 3,4- or 3,5-dimethyldiphenyl ether, 2,2'-, 2,3'-, 3,3'- or 3,4'-dimethyldiphenyl ether, 2- or 4-ethyldiphenyl ether or isomer mixtures as obtained by the ethylation of diphenyl ether, 2- or 4-tert.-butyldiphenyl ether or isomer mixtures, such as are obtained by tert.-butylation of diphenyl ether, and 2-, 3- or 4-phenyldiphenyl ether.

The following are examples of suitable aminoanthraquinones for condensation with monobromodiphenyl ether derivatives: 1-Amino-anthraquinone, 1,4-, 1,5-, 1,6-, 1,7- or 1,8-diaminoanthraquinone, 1,4,5,8-tetraamino-anthraquinone, 4-, 5- or 8-amino-1-anilinoanthraquinone, 4-, 5- or 8-amino-1-(4'-chloroanilino)-anthraquinone, 4-, 5- or 8-amino-1-(2',4'-dichloroanilino)-anthraquinone, 4-, 5- or 8-amino-1-(4'-methoxy- or -methylanilino)-anthraquinone, 6- and 7-chloro-1-amino-anthraquinone, 6,7-dichloro-1-amino-anthraquinone, 2-chloro-1,5-diamino-anthraquinone, 4-, 5- or 8-amino-1-benzoylamino-anthraquinone, 5-amino-1,4-dibenzoylamino-anthraquinone, 4- or 5-amino-1-(2'- or 3'-chlorobenzoylamino)-anthraquinone, 4- or 5-amino-1-hydroxyanthraquinone, 4,8-diamino-1-hydroxy-anthraquinone, 4,5,8-triamino-1-hydroxy-anthraquinone, 5-amino-1,4-dihydroxy-anthraquinone, 5,8-diamino-1,4-dihydroxy-anthraquinone, 4,8-diamino-1,5-dihydroxy-anthraquinone, 4,5-diamino-1,8-dihydroxy-anthraquinone, 8-amino-1,4,5-trihydroxy-anthraquinone, 4-amino-1-methoxy-anthraquinone, 1-amino-4-hydroxy-2-phenoxy-anthraquinone, 4-amino-1-hydroxy- or -methoxy-anthraquinone and 1-amino-4-, -5-, -6- or -8-phenyl-mercapto-anthraquinone.

Preferably, the pure monobromodiphenyl ether or monobromoalkyldiphenyl ether derivatives, such as, for example, 4-bromodiphenyl ether or 4-bromo-4'-methyldiphenyl ether, are used for the condensation with a diaminoanthraquinone.

For condensation with 2- or 3-chlorobenzophenone, 1,5-diaminoanthraquinone is above all suitable.

As polyesters to be dyed, there should in particular be mentioned those which are obtained by polycondensation of terephthalic acid or its esters with glycols of the formula HO—$(CH_2)_n$—OH, wherein n denotes the number 2–10, or with 1,4-di(hydroxymethyl)-cyclohexane, or by polycondensation of glycol ethers of hydroxybenzoic acids, for example p-(β-hydroxyethoxy)-benzoic acid. The term linear polyesters also encompasses copolyesters which are obtained by partial replacement of the terephthalic acid by another dicarboxylic acid or a hydroxycarboxylic acid and/or by partial replacement of the glycol by another diol.

However, polyethylene terephthalates are of particular interest.

The polyesters to be dyed, suitably in the form of powders, chips or granules, are intimately mixed with the dyestuff. This can be done, for example, by sprinkling the polyester particles with the finely divided dry dyestuff powder or by treating the polyester particles with a solution or dispersion of the dyestuff in an organic solvent and subsequently removing the solvent.

Finally, the dyestuff can also be added direct to the fused polyester or be added before or during the polycondensation of the polyethylene terephthalate.

The ratio of dyestuff to polyester can vary within wide limits depending on the desired depth of colour. In general, it is advisable to use 0.01–2 parts of dyestuff per 100 parts of polyester.

The polyester particles treated in this way are fused in an extruder in accordance with known processes and extruded to form articles, in particular films or fibres, or cast to form sheets.

Evenly and intensely coloured articles of high fastness to light are obtained. The dyed fibres obtainable in accordance with the process are furthermore distinguished by outstanding fastness to wet cleaning and dry cleaning.

A particular advantage of the dyestuffs to be used according to the invention is that they dissolve in the polyester melt and, surprisingly, withstand high temperatures, of up to 300°C, without decomposing, so that substantially clearer colorations are obtained than when using insoluble pigments.

In the examples which follow, the parts denote parts by weight.

EXAMPLE 1 a. A mixture of 25 parts of 4-bromodiphenyl ether, 11.8 parts of 1,5-diaminoanthraquinone, 7.5 parts of anhydrous sodium carbonate, 0.5 part of copper powder and 0.5 part of copper-I chloride in 150 parts of nitrobenzene is stirred for 4 hours at the boil, whilst distilling off the water which forms in the reaction.

After cooling, the crystalline reaction product is separated off and washed with a little nitrobenzene, then with alcohol and finally with hot water. To remove the copper, the moist product is after-treated in 5 percent strength hydrochloric acid at 60°C, again filtered off, thoroughly washed with hot water and dried in vacuo at 90°C. 20 parts of dark violet 1,5-bis-(4'-phenoxyanilino)-anthraquinone are obtained.

The product is obtained in practically quantitative yield if instead of filtration the solvent is removed in steam.

b. Non-delustered polyethylene terephthalate granules suitable for the manufacture of fibres are shaken with 1 percent by weight of 1,5-bis-(4'-phenoxyanilino)-anthraquinone in a container which can be closed, for 15 minutes on a shaking machine. The uniformly coloured granules are spun on a melt spinning machine (285°C ± 3°C, dwell time in the spinning machine approx. 5 minutes) to give filaments which are stretched on a stretch-and-twist installation, and are wound up. Because of the solubility of the dyestuff in polyethylene terephthalate, a vivid deep violet coloration is obtained, which is distinguished by outstanding fastness to light, excellent fastness to washing, dry cleaning, cross-dyeing and sublimation and high stability to chlorite bleach.

EXAMPLES 2–5

If instead of 1,5-diaminoanthraquinone equivalent amounts of the diaminoanthraquinones listed in the table below are condensed with 4-bromodiphenyl ether in accordance with the process of Example 1, the corresponding bis-(4'-phenoxyanilino)-anthraquinones are obtained, which dye polyester fibres, in accordance with the melt spinning process described in Example 1, in the colour shades indicated:

| Example | Diaminoanthraquinone | Colour shade |
|---|---|---|
| 2 | 1,4-Diaminoanthraquinone | Green |
| 3 | 1,8-Diaminoanthraquinone | Violet |
| 4 | 1,5-Diamino-4,8-dihydroxyanthraquinone | Blue |
| 5 | 1,5-Diamino-4-hydroxyanthraquinone | Blue |

EXAMPLES 6–13

A mixture of 12 parts of 1-amino-4-hydroxyanthraquinone, 13 parts of 4-bromodiphenyl ether, 5 parts of anhydrous sodium acetate, 0.2 part of copper powder and 0.2 part of copper-I chloride in 100 parts of nitrobenzene is condensed for 26 hours in accordance with Example 1.

After cooling to 70°, 200 parts of alcohol are added to the reaction mixture, which is allowed to cool completely. The reaction product which has separated out as crystals is then separated off, washed with alcohol and further treated in accordance with Example 1.

15 parts of 1-(4'-phenoxyanilino)-4-hydroxyanthraquinone, which dyes polyester in fast blue shades by the melt spinning process, are obtained.

The following dyestuffs are obtained analogously when the corresponding aminoanthraquinone derivatives are condensed with 4-bromodiphenyl ether until the reaction has been completed:

| Example | Dyestuff | Shade in PES |
|---|---|---|
| 7 | 1-(4'-Phenoxyanilino)-4-anilino-anthraquinone | Green |
| 8 | 1-(4'-Phenoxyanilino)-4-benzoyl-amino-anthraquinone | Blue |
| 9 | 1-(4'-Phenoxyanilino)-5-benzoyl-amino-anthraquinone | Claret |
| 10 | 1-(4'-Phenoxyanilino)-4-methoxy-anthraquinone | Violet |
| 11 | 1-(4'-Phenoxyanilino)-4-phenylmercapto-anthraquinone | Violet |
| 12 | 1-(4'-Phenoxyanilino)-5-phenylmercapto-anthraquinone | Red |
| 13 | 1-(4'-Phenoxyanilino)-anthraquinone | Claret |

EXAMPLE 14

12 parts of 1-amino-4-hydroxyanthraquinone are condensed with 13.8 parts of 4-bromo-4'-methyldiphenyl ether and worked up, analogously to the instructions of Example 6. This gives 1-(4'-p-toluyloxyanilino)-4-hydroxyanthraquinone, which dyes polyester in fast blue shades by the melt spinning process.

EXAMPLES 15–22

If 4-bromo-4'-methyl-diphenyl ether is condensed with the monoaminoanthraquinones or diaminoanthraquinones mentioned in the table given below, in accordance with the instructions of Example 6 or 1, dyestuffs are obtained which dye polyester fibres, by the melt spinning process, in the shades indicated.

| Example | | Colour shade |
|---|---|---|
| 15 | 1-Amino-4-benzoylaminoanthraquinone | Blue |
| 16 | 1-Amino-5-benzoylaminoanthraquinone | Claret |
| 17 | 1-Amino-4-anilinoanthraquinone | Green |
| 18 | 1-Amino-5-phenylmercaptoanthraquinone | Red |
| 19 | 1,4-Diaminoanthraquinone | Green |
| 20 | 1,5-Diaminoanthraquinone | Violet |
| 21 | 1,5-Diamino-4-hydroxyanthraquinone | Blue |
| 22 | 1,5-Diamino-4,8-dihydroxyanthraquinone | Blue |

EXAMPLES 23–33

After adding 0.01 part of iodine to a solution of 18.7 g of diphenyl ether in 150 parts of nitrobenzene, a solution of 16 parts of bromine in 50 parts of nitrobenzene is allowed to run in over the course of one hour, whilst stirring. The reaction mixture is stirred for a further hour at room temperature. 20 parts of anhydrous sodium acetate, 23.9 parts of 1-amino-4-hydroxyanthraquinone, 0.5 g of copper-I chloride and 0.5 g of copper powder are then added and the mixture is stirred for 24 hours at 200°–210° whilst distilling the acetic acid formed. After cooling to 70°, 1,000 parts of alcohol are added and the mixture is worked up further in accordance with Example 6.

A blue dyestuff mixture is obtained, which essentially consists of 1-(4'-phenoxyanilino)-4-hydroxyanthraquinone and contains a little 4,4'-di-(4''-hydroxy-1'''-anthraquinonylamino)-diphenyl ether. This mixture dyes polyester fibres in fast blue shades by the melt spinning process. The dyeings are in particular distinguished by good fastness to rubbing after thermofixing of the dyed material.

Similar dyestuffs or dyestuff mixtures are obtained if instead of diphenyl ether equivalent amounts of one of the diphenyl ether derivatives listed in the table which follows are employed for bromination and subsequent condensation with 1-amino-4-hydroxyanthraquinone.

| Example | Diphenyl ether derivatives | Shade of the condensation product, in polyester |
|---|---|---|
| 24 | 4-Methyldiphenyl ether | Blue |
| 25 | 3-Methyldiphenyl ether | Blue |
| 26 | 2,4-Dimethyldiphenyl ether | Blue |
| 27 | 2,5-Dimethyldiphenyl ether | Blue |
| 28 | 3,4-Dimethyldiphenyl ether | Blue |
| 29 | 2,4'-Dimethyldiphenyl ether | Blue |
| 30 | 4-Ethyldiphenyl ether | Blue |
| 31 | 4-tert.-Butyldiphenyl ether | Blue |
| 32 | 2-Phenyldiphenyl ether | Blue |
| 33 | 4-Phenyldiphenyl ether | Blue |

EXAMPLES 34–40

If the compounds mentioned below are used to dye polyester fibres, the colour shades indicated in the table are obtained:

| Example | Dyestuff | Colour shade |
|---|---|---|
| 34 | 1,5-Bis-(2'-p-phenylbenzoylanilino)-anthraquinone | Claret |
| 35 | 1,5-Bis-(2'-benzoylanilino-anthraquinone | Claret |
| 36 | 1,5-Bis-(3'-p-phenylbenzoylanilino)-anthraquinone | Claret |
| 37 | 1,5-Bis-(2'-p-methylbenzoylanilino)-anthraquinone | Claret |
| 38 | 1,5-Bis-(3'-benzoylanilino)-anthraquinone | Claret |
| 39 | 1,5-Bis-(4'-methyl-3'-benzoyl-anilino)-anthraquinone | Claret |
| 40 | 1-(2'-p-phenylbenzoylanilino)-anthraquinone | Orange |

What we claim is:
1. Process for the bulk dyeing of polyesters, characterised in that the dyestuffs used are anthraquinone derivatives of the formula

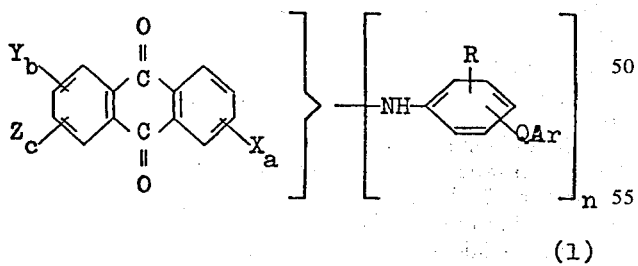

(1)

wherein Q denotes one of the bridge members —O— or —CO—, R denotes hydrogen or an alkyl group containing 1–4 carbon atoms, Ar denotes an aryl group, $n$ denotes a number from 1 to 4, X, Y and Z denote an amino, hydroxyl, alkoxy, aryloxy, alkylmercapto, arylmercapto, arylamino or aroylamino group or halogen and $a$, $b$ and $c$ each denote zero or a number from 1 to 4, with the sum of $n+a+b+c$ being a number from 1 to 6.

2. Process according to claim 1, characterised in that the dyestuffs used are anthraquinone derivatives of the formula

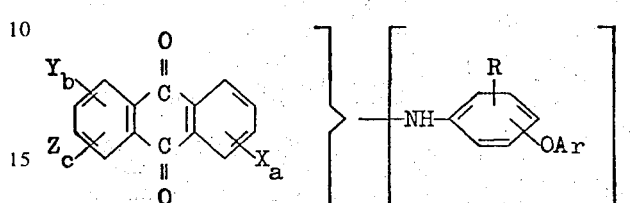

(2)

wherein R, Ar, $n$, X, Y, Z, $a$, $b$ and $c$ have the meaning indicated in claim 1.

3. Process according to claim 1, characterised in that the dyestuffs used are anthraquinone derivatives of the formula

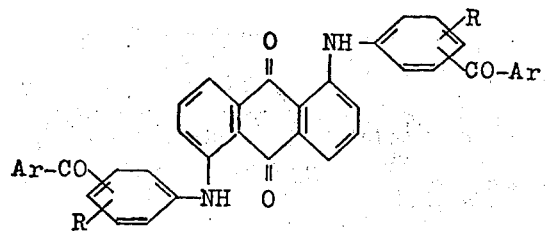

wherein R and Ar have the meaning indicated in claim 1 and the -CO-Ar radicals are in the ortho-position or meta-position to the imino groups.

4. Process according to claim 1, characterised in that the dyestuffs used are anthraquinone derivatives of the formula

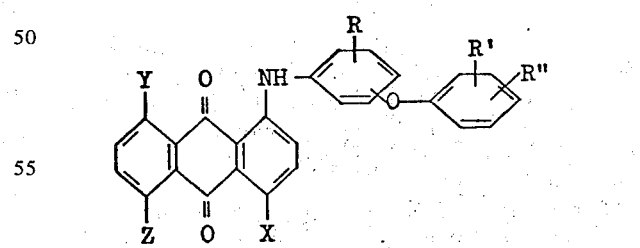

wherein X, Y and Z denote hydrogen or a hydroxyl, benzoylamino, phenylamino or phenylmercapto group and one of the radicals X, Y and Z can also be

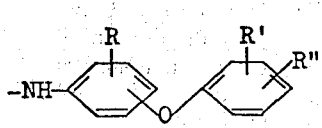

R has the meaning indiated in claim 1 and R' and R'' can be a hydrogen atom or an alkyl group containing 1–4 carbon atoms or, if R and R' are hydrogen atoms, R'' also denotes the phenyl group.

5. Process according to claim 1, characterised in that the dyestuffs used are anthraquinone derivatives of the formula

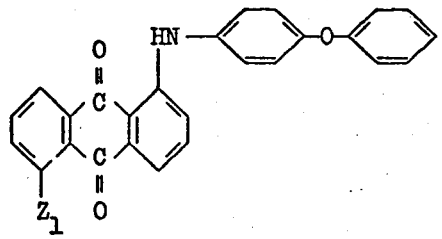

wherein $Z_1$ is a benzoylamino, phenylmercapto or 4-phenoxyanilino group.

6. Process according to claim 3, characterised in that the dyestuffs used are anthraquinone derivatives of the formula

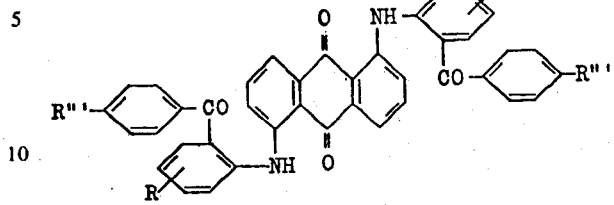

wherein T''' denotes hydrogen or the phenyl radical and R has the meaning indicated in claim 1.

7. Process according to claim 6, characterised in that the dyestuffs used are anthraquinone derivatives of the formula

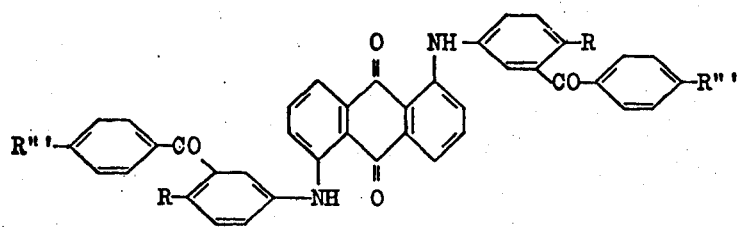

8. The polyester material dyed with a dyestuff according to claim 1.

* * * * *